July 14, 1959   P. W. HENNIG   2,894,437
ATTACHABLE ROLLFILM CHANGING MAGAZINES
Filed Aug. 16, 1955   2 Sheets-Sheet 1
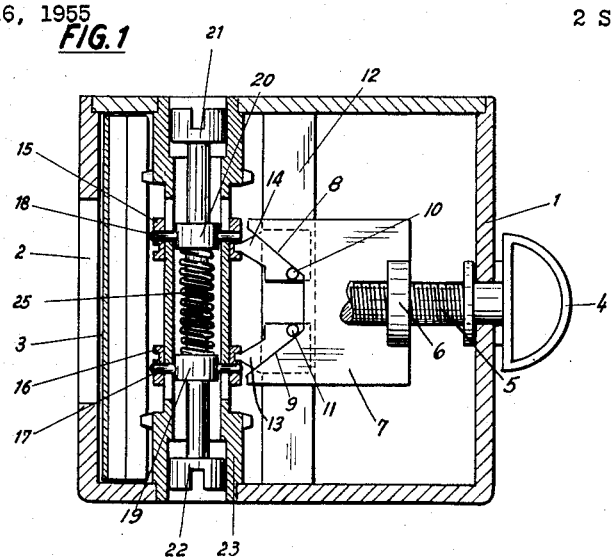
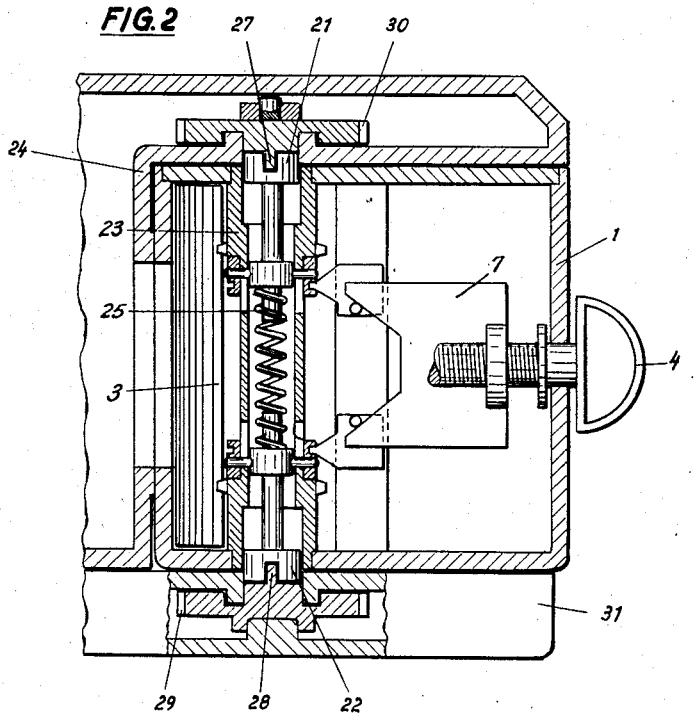
INVENTOR.
Paul Walter HENNIG
BY July 14, 1959 P. W. HENNIG 2,894,437
ATTACHABLE ROLLFILM CHANGING MAGAZINES
Filed Aug. 16, 1955 2 Sheets-Sheet 2
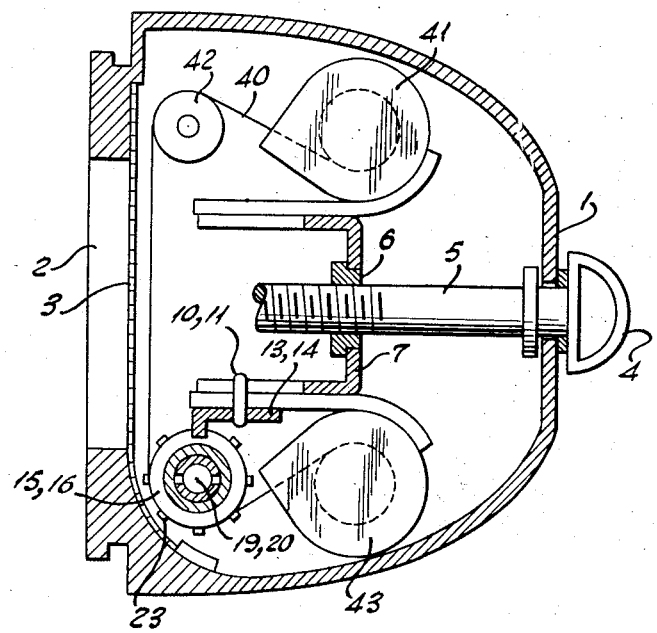
INVENTOR
PAUL WALTER HENNIG
BY
ATTORNEY 2,894,437

ATTACHABLE ROLLFILM CHANGING MAGAZINES

Paul Walter Hennig, Dresden, Germany, assignor to VEB Zeiss Ikon, Dresden, Germany Application August 16, 1955, Serial No. 528,726

10 Claims. (Cl. 95—34)

This invention relates to a rollfilm changing magazine attachable to cameras provided with a coupled drive for film transport and shutter tensioning.

In such arrangements the film advancing mechanism of the magazines must be connected with the shutter mechanism of the camera and also with the common drive disposed in the camera or magazine at the separating point of the camera and magazine by a clutch coupling which can be readily thrown out. For this purpose claw clutches are particularly suitable.

In numerous constructions the point of separation is such that the coupling elements draw apart in axial direction. As the claw is not always positioned opposite the slit, a part thereof is elastically arranged to permit turning out until during further rotation non-positive connection is effected.

For structural reasons the arrangement is often so that uncoupling occurs at right angles to the coupling shaft while the claw is required to be in a position relative to the slit enabling the clutch elements to move out. At each end of a film or owing to shutter or other troubles it may happen that winding is incomplete, and in this case clutch elements of conventional type will be so positioned that they cannot be separated and the magazine cannot be removed from the camera.

According to the invention, the coupling elements or means on the magazine, preferably during the closing of the roller blind shutter, are drawn back and out of their engagement with their complementary elements provided in the camera in the axial direction of the clutch, while clutching is effected in non-positive manner. In this way obstruction is prevented when the elements are not in exact opposite position. The arrangement of the clutch according to the invention permits also coupling of the drive of the magazine for instance with the camera and an automatic winding gear, as spring mechanism or motor.

By way of example, one form of the invention is illustrated in the accompanying drawings, wherein Figure 1 shows a changing magazine removed from the camera body;

Fig. 2 shows the changing magazine attached to the camera in coupled and ready position, and a spring mechanism attached to the camera; and Fig. 3 is a top view of the interchangeable film magazine of Fig. 1 shown in cross-sectional top view.

In Fig. 1 the exposure aperture 2 in the magazine casing 1 is closed by the blind 3 which is closed by turning the handle or actuating means 4, actuating gear members not shown. During the turning of the handle 4 a slide or cam means 7 is simultaneously moved toward the aperture 2 by means of the spindle 5 and nut 6, the oblique edges or cam surfaces 8, 9 of the slide striking against abutments or pins 10, 11 firmly connected with dogs 13, 14. These dogs are displaceably disposed on the guide 12 and approach each other when the slide 7 moves. As the dogs 13, 14 are connected with displaceable bushings 15, 16 and these again with rotatable coupling means or shafts 19, 20 by pins 17, 18, the coupling heads 21, 22 with their slits are drawn into the toothed drum 23, whereby the film transport members in the magazine and camera body are uncoupled.

The coupling means 19, 22 and 20, 21 respectively are axially aligned and reciprocally movable towards and away from each other.

As will be seen from the drawings, the bushes 15, 16 comprise grooves in which the dogs engage. The bushes with their grooves on the one hand and the dogs on the other hand thus comprise cooperating engaging means. The slide 7 and the dogs 13, 14 with their abutments 10, 11 constitute adjustable controlling means which move the rotatable coupling means 19—22 from their active position, i.e. the position wherein they are ready for coupling engagement with their complementary elements 27 and 28, respectively, into their inactive position, wherein the coupling means are disengaged from the complementary elements and held within the casing against the force of the spring 25. The positive connection between the coupling means 19—22 is effected by the pins 17, 18 passing through recesses of a sleeve surrounding the coupling means.

The magazine 1 shown in Fig. 2 is interlocked with the camera body 24 in a manner not shown. The handle 4 has been reversely actuated, and the blind 3 has been so positioned that the aperture 2 is ready for exposure. Simultaneously, the slide 7 has been moved away from the aperture 2, and the coupling heads 21, 22 can therefore be moved out of the teeth of the drum 23 by the spring 25 and within coupling range to take up the coupling elements 27, 28 in their slits.

As the clutching element 27 is firmly connected to the transmission wheel 30 and the element 28 to the transmission wheel 29 of the screwed-on spring mechanism 31, coupling of the film driving means in the camera body, the spring mechanism and the film transport members in the magazine is effected.

Should the position of the coupling elements and of the slits of the coupling heads not agree when the magazine is attached, a slight turn of the film feeding means in the camera or of the spring mechanism will automatically remedy this condition.

As illustrated in Fig. 3, the film strip 40 is transported in known manner from a film holder 41 over the guide roller 42 by the toothed film transport drum 23 and is fed into film holder 43. The film holder 1, in which aperture 2 is located, is provided with a sliding cover or blind 3, located between the aperture 2 and the film strip 40 and which serves to prevent light from falling on and damaging the film 40 while film holder 1 is being removed from the camera. Toothed film transport drum 23 is provided with longitudinal slots (not numbered) which engage pins 17, 18 on coupling shafts 19, 20, thus connecting drum 23 with the camera drive by means of withdrawable coupling heads 21, 22.

What I claim is:

1. In a film magazine for insertion into a camera and for detachable operative coupling of the film transport mechanism in said magazine to the drive and the mechanism of the camera, the combination of: a casing, a first rotatable coupling means arranged in said casing to engage said film transport mechanism, a second rotatable coupling means arranged in said casing, means positively connecting said two rotatable coupling means with each other, each of said rotatable coupling means being movable between an inactive position wherein it is disengaged from a complementary coupling element arranged outside the magazine and an active position wherein it is ready for coupling engagement with said complementary coupling element, resilient means operatively engaged with said first and second rotatable coupling means for urging same into their active position, and adjustable controlling means capable of operative engagement with said first and second rotatable coupling means for urging same into their inactive position against the action of said resilient means.

2. In a film magazine as claimed in claim 1, said first and second rotatable coupling means extending in axial alignment and being reciprocably movable towards and away from each other in response to the action of said controlling means and said resilient means respectively.

3. In a film magazine as claimed in claim 1, said first and second rotatable coupling means extending in axial alignment and being reciprocably movable towards and away from each other in response to the action of said controlling means and said resilient means, respectively, said first and second rotatable coupling means protruding from said casing in their active position, and said first and second rotatable coupling means being wholly confined within said casing in their inactive position.

4. In a film magazine as claimed in claim 1, at least one of said rotatable coupling means being a claw coupling means.

5. In a film magazine as claimed in claim 1, first engaging means positively connected with said first rotatable coupling means, second engaging means positively connected with said second rotatable coupling means, said adjustable controlling means including movable third engaging means arranged in said casing for engaging cooperation with said first engaging means, movable fourth engaging means arranged in said casing for engaging cooperation with said second engaging means, and said adjustable controlling means further comprising movable cam means capable of engagement with said third and fourth engaging means for moving same so as to move said first and second coupling means from their active into their inactive position, said movable cam means being movable between an ineffective condition wherein said first and second coupling means are in their active position and an effective position wherein said cam means through the medium of said engaging means hold said first and second coupling means in their inactive position against the action of said resilient means.

6. In a film magazine as claimed in claim 5, wherein each of said first and second engaging means comprises a bush element having a groove, each of said third and fourth engaging means comprises a dog member movably arranged in the casing and projecting into the groove of the respective bush element and each dog member is provided with abutment means cooperating with said cam means.

7. In a film magazine as claimed in claim 5, said third and fourth engaging means having abutment means, and said movable cam means comprising a slide member having cam surfaces cooperating with said abutment means.

8. In a film magazine as claimed in claim 1, said first and second rotatable coupling means extending in axial alignment and being reciprocably movable towards and away from each other in response to the action of said controlling means and said resilient means respectively, first engaging means positively connected with said first coupling means, second engaging means positively connected with said second coupling means, and said controlling means comprising movable third and fourth engaging means for engaging cooperation with said first and second engaging means respectively, said third and fourth engaging means being reciprocably movable towards and away from each other in a plane parallel to that of said first and second coupling means, abutment means on said third and fourth engaging means, and a movable slide member having a cam surface capable of cooperation with said abutment means for moving same towards each other, said slide member being movable between an ineffective condition wherein said first and second coupling means are urged into their active positions by said resilient means and an effective position wherein said first and second coupling means are held in their inactive position against the action of said resilient means by said cam surface bearing on said abutment means on said third and fourth engaging means.

9. In a film magazine as claimed in claim 1, actuating means operatively connected with said controlling means and accessible from the outside of said casing for actuating said controlling means.

10. In a film magazine for insertion into a camera and for detachable operative coupling of the film transport mechanism in said magazine to the drive and the mechanism of the camera, the combination of: a casing, a first rotatable claw coupling means arranged in said casing to engage said film transport mechanism, a second rotatable claw coupling means arranged in said casing, said first and second claw coupling means being axially aligned and reciprocably movable towards and away from each other, means positively connecting said two claw coupling means, each of said claw coupling means being movable between an inactive position wherein it is disengaged from a complementary claw coupling element arranged in the camera and an active position wherein it is ready for coupling engagement with said complementary claw coupling element, spring means interposed between the facing ends of said two coupling means for urging same into their active positions, a first bush member positively connected with said first claw coupling means, a second bush member positively connected with said second claw coupling means, said first and second bush members each having a circumferential groove, a first movable dog member engaging in the groove of said first bush member, a second movable dog member engaging in the groove of said second bush member, said two dog members being reciprocably movable towards and away from each other in a plane parallel to the axial plane of said two coupling means, said dog members each having an abutment element, a slide member reciprocably movable within said casing in a plane perpendicular to the axial plane of said two coupling means, said slide member having a cam surface capable of simultaneous engagement with the abutment elements on said two dog members for moving same towards each other, whereby said two coupling means are moved into their inactive position against the action of the spring means.

References Cited in the file of this patent

UNITED STATES PATENTS

| | | |
|---|---|---|
| 1,713,503 | Von Madaler | May 14, 1929 |
| 2,211,334 | Lechleitner | Aug. 13, 1940 |